United States Patent [19]

Sanchez

[11] Patent Number: 4,486,580
[45] Date of Patent: Dec. 4, 1984

[54] PROCESS FOR USING T-ALKYL PEROXY-2-ALKYL-2-ARYLACETATES AS FREE-RADICAL INITIATORS AND CURING CATALYSTS

[75] Inventor: Jose Sanchez, Grand Island, N.Y.

[73] Assignee: Pennwalt Corporation, Philadelphia, Pa.

[21] Appl. No.: 496,728

[22] Filed: May 20, 1983

[51] Int. Cl.³ ............................ C08F 4/34; C08F 4/36
[52] U.S. Cl. ................................. 526/232; 526/232.3; 525/27
[58] Field of Search ................ 526/232, 232.3; 525/27

[56] References Cited

U.S. PATENT DOCUMENTS

| | | | |
|---|---|---|---|
| 2,608,570 | 8/1952 | Harman | 260/453 |
| 3,427,341 | 2/1969 | Bailey | 526/232 |
| 3,458,557 | 7/1969 | Milas | 526/232 |
| 4,092,470 | 5/1978 | Oosterwijk | 526/232 |

OTHER PUBLICATIONS

R. A. Wolfe et al., "Properties of Small Ring Free Radicals", I. Thermal Decomposition of α-substituted Cyclopropyl Percarboxylates, Tetrahedron Letters, No. 14, pp. 1265-1266, 1975.

J. P. Lorand, "Radicals and Scavengers", J. Am. Che. Soc., 96, 2867, (1974).

Primary Examiner—John C. Bleutge
Assistant Examiner—Patricia Short

[57] ABSTRACT t-Alkyl peroxy-2-alkyl-2-arylacetates having the general structure A,

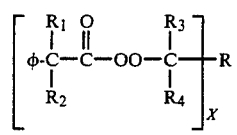

are used in an improved process for polymerization of ethylenically unsaturated monomers, such as ethylene and vinyl chloride, and for curing of unsaturated polyester resin compositions.

2 Claims, No Drawings

PROCESS FOR USING T-ALKYL PEROXY-2-ALKYL-2-ARYLACETATES AS FREE-RADICAL INITIATORS AND CURING CATALYSTS

BACKGROUND OF THE INVENTION

This invention relates to novel processes employing t-alkyl peroxy-2-alkyl-2-arylacetates (A) as free radical initiators for improved vinyl monomer polymerization processes and as curing catalysts for improved unsaturated polyester resin composition curing processes.

There is a need in the polymer industry for increasing the production capacity of polymer production facilities without having to simultaneously build additional expensive production facilities especially in times of high inflation and high interest rates. It has been found that the t-alkyl peroxy-2-alkyl-2-arylacetates of this invention which are derived from substituted acetic acids that contain no more than one alpha-aryl substituent and at least one alpha-alkyl substituent, are significantly more efficient initiators for polymerizing vinyl chloride monomer to PVC than are commercially available t-butyl peroxyneodecanoate (three alpha-alkyl substituents) or the art compound, t-butyl peroxydiphenylacetate (two alpha-aryl substituents). These invention peroxyesters have, also, been found to be much more effective curing catalysts for unsaturated polyester resin compositions than were commerical peroxyesters such as t-butyl peroxypivalate.

SUMMARY OF THE INVENTION

The present invention is directed to:

A. A process of polymerizing ethylenically unsaturated monomers (such as vinyl chloride) comprising adding to the reaction mass of said monomers an initiating amount of t-alkyl peroxy-2-alkyl-2-arylacetates of Structure A,

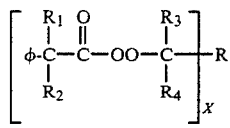

as the initiator and polymerizing said reaction mass until completion of th reaction wherein $R_1$ hydrogen or an alkyl of 1 to 8 carbons, $R_2$ is an alkyl of 1 to 8 carbons, $R_1$ and $R_2$ can be joined together through an alkylene chain to form a cycloalkane ring of 5 to 6 carbons, $\phi$ is an aryl of 6 to 10 carbons, $R_3$ and $R_4$ are lower alkyl of 1 to 4 carbons and can be joined together through an alkylene chain to form a cycloalkane ring of 5 to 6 carbons, and X is an integer of 1–2, with the provisos that when X is 1, R is a substituted or unsubstituted alkyl of 1 to 9 carbons or an alkynyl of 2 carbons, and when X is 2, R is an alkylene diradical of 2 to 4 carbons, or an alkynylene diradical of 2 carbons, wherein the substituents of R are selected from lower alkyl, hydroxy, or t-alkylperoxy.

B. A process of curing unsaturated polyester resin compositions comprising adding to the reaction mass of said polyester resin composition a catalyzing amount of the t-alkyl peroxy-2-alkyl-2-arylacetates of structure (A) as curing agents and heating said reaction mass at the appropriate temperatures until completion of the reaction.

DETAILED DESCRIPTION OF THE INVENTION

Preparation of the t-Alkyl Peroxy-2-alkyl-2-arylacetates

The t-alkyl peroxy-2-alkyl-2-arylacetates (A) of this invention can be prepared by reacting appropriate acid chloride or acid bromide with a t-alkyl hydroperoxide in the presence of a base.

The preferred acid chlorides can be prepared from the corresponding carboxylic acids by reacting with acid chlorinating agents such as $PCl_3$, $POCl_3$, $PCl_5$, $SOCl_2$, phosgene (in the presence of catalysts such as N,N-dimethylformamide) and benzotrichloride followed by isolation of the acid chloride product from the reaction mixture.

Carboxylic acids that are useful for producing the t-alkyl peroxy-2-alkyl-2-arylacetates (A) of this invention include 2-alkyl-2-arylacetic acids such as 2-phenylpropionic acid, 2-naphthylpropionic acid, 2-phenylbutryic acid, 2-phenylhexanoic acid, 2-phenyldecanoic acid, 2-methyl-2-phenylpropionic acid, 2-methyl-2-phenylbutyric acid, 1-carboxy-1-phenylcyclohexane and 1-carboxyl-1-phenylcyclopentane. In general these acids can be prepared by reacting a 2-arylacetonitrile, such as 2-phenylacetonitrile (benzyl cyanide) with an alkyl chloride or alkyl bromide in the presence of a base followed by hydrolysis of the resulting 2-alkyl-2-arylacetonitrile to the desired 2-alkyl-2-arylacetic acid.

Other methods for preparing the 2-alkyl-2-arylacetic acids are known in the art.

t-Alkyl hydroperoxides that are useful for producing the t-alkyl peroxy-2-alkyl-2-arylacetates (A) of this invention include t-butyl hydroperoxide, t-amyl hydroperoxide, 1,1,3,3-tetramethylbutyl hydroperoxide, 1,1-dimethyldecyl hydroperoxide, paramenthane hydroperoxide, 1-methyl-1-cyclohexyl hydroperoxide, 3-methyl-3-hydroperoxy-1-butyne, 3-methyl-3-hydroperoxy-1-pentyne, 1-ethynyl-1-cyclohexyl hydroperoxide, 3-hydroxy-1,1-dimethylbutyl hydroperoxide, 2,5-dimethyl-2,5-dihydroperoxyhexane, 2,7-dimethyl-2,7-dihydroperoxyoctane, 2,5-dimethyl-2,5-dihydroperoxy-3-hexyne and 1,1,4,4-tetramethyl-4-(t-butylperoxy)butyl hydroperoxide. These hydroperoxides can be made by processes well known in the art.

The bases that are useful in preparing the t-alkyl peroxy-2-alkyl-2-arylacetates (A) of this invention include inorganic bases such as NaOH, KOH, LiOH, $Na_2CO_3$ and $K_2CO_3$ and organic amines such as pyridine, N,N-dimethylaniline, triethylamine, tributylamine and 1,4-diazabicyclo [2.2.2] octane.

Some of the t-alkyl peroxy-2-alkyl-2-arylacetates that are useful in the processes of this invention are as follows:

t-Butyl peroxy-2-phenylpropionate,
t-Amyl peroxy-2-phenylpropionate,
t-Butyl peroxy-2-methyl-2-phenylpropionate,
t-Butyl peroxy-2-phenylbutyrate,
t-Amyl peroxy-2-phenylbutyrate,
1,1,3,3,-Tetramethylbutyl peroxy-2-phenylbutyrate,
1,1-Dimethyldecyl peroxy-2-phenylbutyrate,
1,1-Dimethyl-2-propynyl peroxy-2-phenylbutyrate,
1-Methyl-1-cyclohexyl peroxy-2-phenylbutyrate,
3-Hydroxy-1,1-dimethylbutyl peroxy-2-phenylbutyrate, 1,1,4,4-Tetramethyl-4-(t-butylperoxy)butyl peroxy-2-phenylbutyrate,
2,5-Dimethyl-2,5-di-(2-phenylbutyrylperoxy)hexane,
2,7-Dimethyl-2,7-di-(2-phenylbutyrylperoxy)octane,
2,5-Dimethyl-2,5-di-(2-phenylbutyrylperoxy)-3-hexyne,
1-(t-Butylperoxycarbonyl)-1-phenylcyclopentane, and
1-(t-Amylperoxycarbonyl)-1-phenylcyclopentane.

Vinyl Polymerizations

In the free-radical polymerizations or copolymerizations of ethylenically unsaturated monomers at suitable temperatures (and pressures), the t-alkyl peroxy-2-alkyl-2-arylacetates (A) of this invention are found to be effective initiators with respect to efficiency (reduced initiator requirements). Ethylenically unsaturated monomers include olefins, such as ethylene, propylene, styrene, alphamethylstyrene, chlorostyrene, vinyltouene, vinylbenzyl chloride, vinylpyridine and divinylbenzene; diolefins, such as 1,3-butadiene, isoprene and chloroprene; vinyl esters such as vinyl acetate, vinyl propionate, vinyl laurate, vinyl benzoate and divinyl carbonate; unsaturated nitriles, such as acrylonitrile and methacrylonitrile; acrylic acid, methacrylic acid and their esters and amides, such as methyl, ethyl, n-butyl and 2-ethylhexyl acrylates and methacrylates, and acrylamide and methacrylamide; maleic anhydride; maleic and fumaric acids and their esters; vinyl halo and vinylidene halo compounds, such as, vinyl chloride, vinyl bromide, vinyl fluoride, vinylidene chloride and vinylidene fluoride; perhalo olefins, such as tetrafluoroethylene, hexafluoropropylene and chlorotrifluoroethylene; vinyl ethers, such as methyl vinyl ether, ethyl vinyl ether and n-butyl vinyl ether; allyl esters, such as allyl acetate, allyl benzoate, diallyl phthalate, allyl ethyl carbonate, triallyl phosphate, diallyl fumarate and diallyl carbonate; acrolein; methyl vinyl ketone; and mixtures thereof.

Temperatures of 20° C. to 250° C., preferably 30° C. to 200° C., and peroxyester levels (on a pure basis) of 0.002 to 3%, preferably 0.002 to 1% by weight based on monomer, are employed in conventional polymerizations or copolymerizations of ethylenically unsaturated monomers.

The t-alkyl peroxy-2-alkyl-2-arylacetates (A) of this invention can also be used in combination with other free-radical initiators such as peroxyesters which include t-butyl peroxypivalate, t-butyl peroxy-2-ethylhexanoate, t-butyl peroxyacetate, t-amyl peroxypivalate, t-butyl peroxyneodecanoate, t-amyl peroxyneodecanoate, 1,1,3,3,-tetramethylbutyl peroxyneodecanoate and alphacumyl peroxyneodecanoate; dialkyl peroxydicarbonates including di-n-propyl, diisopropyl, di-(sec-butyl), dicyclohexyl, di-(4-t-butylcyclohexyl), di-(2-phenoxyethyl), di-2-ethylhexyl) and dihexadecyl peroxydicarbonates; acyl alkylsulfonyl peroxides including acetyl cyclohexylsulfonyl peroxide and acetyl sec-heptylsulfonyl peroxide; diacyl peroxides including dibenzoyl peroxide, didodecyl peroxide, diisobutyryl peroxide and di-(2-methylpentanoyl) peroxide; diperoxyketals including 2,2-di-(t-butylperoxy)butane, 2,2-di-(t-butylperoxy)-heptane, ethyl 3,3-di-(t-butyl-peroxy)butyrate, 1,1-di(t-butylperoxy)-3,3,5-trimethylcyclohexane, 1,1-di(t-butylperoxy)cyclohexane and 1,1-di(t-amylperoxy)cyclohexane; monoperoxycarbonates including OO-t-butyl O-isopropyl monoperoxycarbonate and OO-t-butyl O-(2-ethylhexyl) monoperoxycarbonate; dialkyl peroxide such as 2,5-dimethyl-2,5-di-(t-butylperoxy)hexane; and azo compounds including azobis(isobutyronitrile), 2-t-butylazo-2-cyano-4-methoxy-4-methylpentane and 1-t-butylazo-1-cyanocyclohexane.

Curing of Unsaturated Polyester Resins

In the curing of unsaturated polyester resin compositions by heating at suitable curing temperatures in the presence of free-radical curing agents, the t-alkyl peroxy-2-alkyl-2-arylacetates A of this invention exhibit enhanced curing activity. Unsaturated polyester resins that can be cured by the peroxides of this invention usually consist of an unsaturated polyester and one or more polymerizable monomers.

The unsaturated polyesters are, for instance, polyester as they are obtained by esterifying at least one ethylenically unsaturated di-or polycarboxylic acid, anhydride or acid halide, such as maleic acid, fumaric acid, glutaconic acid, itaconic acid, mesaconic acid, citraconic acid, allylmalonic acid, allylsuccinic acid, tetrahydrophalic acid and others with saturated or unsaturated di- or polyols, such as ethylene glycol, diethylene glycol, triethylene glycol, 1,2- and 1,3-propanediols, 1,2-, 1,3-, and 1,4-butanediols, 2,2-dimethyl-1,3-propanediol, 2-hydroxymethyl-2-hydroxymethyl-2-methyl-1,3-propanediol, 2-buten-1,4-diol, 2-butyn-1,4-diol, 2,2,4-trimethyl-1,3-pentanediol, glycerol, pentaerythritol, mannitol, and others. Mixtures of such polyacids and/or mixtures of such polyalcohols may also be used. The unsaturated di- or polycarboxylic acids may be partially replaced, by saturated polycarboxylic acids, such as adipic acid, succinic acid, sebacid acid and others and/or by aromactic polycarboxylic acids, such as phthalic acid, trimellitic acid, pyromellitic acid, isophthalic acid and terephthalic acid. The acids used may be substituted by groups such as halogen. Examples of such suitable halogenated acids are, for instance, tetrachlorophthalic acid, 5,6-dicarboxyl-1,2,3,4,7,7,-hexachlorobicyclo(2.2.1)-2-heptene and others.

The other component of the unsaturated polyester resin composition, the polymerizable monomer or monomers, can be preferably ethylenically unsaturated monomers, such as styrene, chlorostyrene, vinyltoluene, divinylbenzene, alpha-methylstyrene, diallyl maleate, diallyl phthalate, dibutyl fumarate, acrylonitrile, triallyl phosphate, triallyl cyanurate, methyl acrylate, methyl methacrylate, n-butyl methacrylate, ethyl acrylate and others, or mixtures thereof, which are copolymerizable with said polyesters.

A preferred resin composition contains as the polyester component the esterification product of 1,2-propylene glycol (a polyalcohol), maleic anhydride (an anhydride of an unsaturated polycarboxylic acid) and phthalic anhydride (an anhydride of an aromatic dicarboxylic acid) as well as the monomer component, styrene. Temperatures of about 20° C. to 200° C. and peroxide levels of about 0.05% to 5% or more by weight of curable unsaturated polyester resin are normally employed. The unsaturated polyesters described above can be filled with various materials such as sulfur, glass fibers, carbon blacks, silicas, metal silicates, clays, metal carbonates, antioxidants, heat and light stabilizers, sensitizers, dyes, pigments, accelerators, metal oxides such as zinc oxide, blowing agents, etc.

Other types of unsaturated resins can be cured using the compositions of this invention as curing catalysts. These resins, called unsaturated vinyl ester resins, consist of a vinyl ester resin component and one or more polymerizable monomer componets. The vinyl ester resin component can be made by reacting a chloroepoxide such as epichlorohydrin with appropriate amounts of a glycol such as Bisphenol A [2,2-di(4-hydroxyphenyl)propane], in the presence of a base such as sodium hydroxide, to yield a condensation product having terminal epoxy groups derived from epichlorohydrin. Subsequent reaction of the condensation product with polymerizable unsaturated carboxylic acids such as acrylic acid and methacrylic acid, in the presence or absence of acidic or basic catalysts, results in formation of a vinyl ester terminated resin component. Normally styrene is added as the polymerizable monomer component to complete the preparation of the unsaturated vinyl ester resin. Temperatures of about 20° C. to 200° C. and pure peroxide levels of about 0.05% to 5% or more by weight of curable unsaturated vinyl ester resin compositions are normally employed for curing of the unsaturated vinyl ester resins. The unsaturated resin described above can be filled with the materials employed with the unsaturated polyester resin compositions described previously.

The t-alkyl peroxy-2-alkyl-2-arylacetates (A) of this invention can also be employed for curing of monomers such as diethylene glycol bis(allyl carbonate) (ADC) as well as other diallyl and polyallyl compounds. In these applications 0.1 to 10% or more of the invention peroxyesters, based on curable monomer, can be employed. Temperature profiles are usually employed in the ADC curing processes. The temperatures range from about 70° C. initially to about 125° C. and the time for curing can range up to 10 hours.

EXAMPLES

The 2-alkyl-2-arylacetyl chlorides used as starting materials for preparing the t-alkyl peroxy-2-alkyl-2-arylacetates of the present invention were prepared from the corresponding acid and $SOCl_2$ using the following method as illustrating the preparation of 2-phenylbutyryl chloride:

A jacketed 3-neck flask equipped with a condenser, an efficient stirrer and a thermometer was charged with 179 g (1.50 moles) of thionyl chloride ($SOCl_2$) followed by rapid addition of 164.2 g (1.00 mole) of granular 2-phenylbutyric acid at room temperature. The mixture was stirred at room temperature for 60 minutes, then heated to 90° to 92° C. (reflux) and stirred at 90° to 92° C. for 180 minutes. The resulting solution was then cooled to room temperature and the excess $SOCl_2$ was removed in vacuo at 20° to 25° C./15 to 30 mm pressure over a period of about 180 minutes. The resulting dark liquid weighed 195 g and had an assay of about 100% according to hydrolzable chloride content. The yield was 100%.

EXAMPLE 1

Preparation of t-Butyl Peroxy-2-phenylbutyrate (I-1)

A jacketed reactor equipped with an efficient mechanical stirrer, a thermometer and a dropping funnel was charged with 12.2. g (0.153 mole) of 50% NaOH, 28.5 g of water and 15.3 g (0.153 mole) of 90% t-butyl hydroperoxide (added over 15 minutes) at 20° to 25° C. To the resulting solution at 28° to 30° C. was slowly added 23.2 g (0.127 mole) of 2-phenylbutyryl chloride over a period of 10 to 15 minutes. The resulting mixture was then heated to 40° C. and held at 40° C. for 15 minutes. The reaction mixture was then cooled to 10° C. and 100 ml of pentane was added to the stirred mixture. The mixture was allowed to separate into two liquid phases and after separation of the lower aqueous layer the pentane solution was washed at 10° to 15° C. twice with 50 g portions of a 10% KOH solution, twice with 50 g portions of a 10% $NaHSO_3$ solution, once with 50 g of a 10% KOH solution and three times with 50 g portions of cold water. The pentane solution was then dried over anhydrous $MgSO_4$ and after separation of the spent desiccant by filtration the pentane was removed in vacuo. Obtained was 23.6 g of yellow liquid which had an assay of 83.8% according to peroxyester active oxygen content. The corrected yield was 65.9%. Another similar preparation of t-butyl peroxy-2-phenylbutyrate was carried out. In this case the assay of the product was 97.8% and the corrected yield was 90.9%.

EXAMPLE 2

Preparations of other t-Alkyl Peroxy-2-alkyl-2-arylacetates

Employing the procedure of Example 1 several other invention t-alkyl peroxy-2-alkyl-2-arylacetates were prepared from the corresponding 2-alkyl-2-arylacetyl chlorides and various t-alkyl hydroperoxides. The assays and yields of the resulting products are summarized in the following Table I. Included in Table I (but not covered by invention structure A) is t-butyl peroxy-2,2-diphenylacetate (C-1). This closely related peroxyester (a homologue) clearly demonstrates the criticalness of the structure A.

TABLE I

| t-Alkyl Peroxy-2-alkyl-2-arylacetates | | | | |
|---|---|---|---|---|
| t-Alkyl Peroxy-2-alkyl-2-arylacetate | Reactants | Assay, % | Corr. Yield, % | Physical State |
| t-Butyl Peroxy-2-phenylbutyrate (I-1) | 2-Phenylbutyryl chloride, | 97.8 | 90.9 | Liquid |
| t-Amyl Peroxy-2-phenylbutyrate (I-2) | 2-Phenylbutyryl chloride, t-Amyl hydroperoxide | 95.3 | 71.0 | Liquid |
| 1,1,3,3-Tetramethylbutyl Peroxy-2-phenylbutyrate (I-3) | 2-Phenylbutyryl chloride 1,1,3,3-Tetramethylbutyl hydroperoxide | 96.3 | 93.0 | Liquid |
| 1,1,4,4-Tetramethyl-4-t-butyl-peroxybutyl Peroxy-2-phenyl-butyrate (I-4) | 2-Phenylbutyryl chloride, 1,1,4,4-tetramethyl-4-t-butylperoxybutyl hydroperoxide | 83.1 | 83.1 | Liquid |
| 2,5-Dimethyl-2,5-di-(2-phenylbutyryl-peroxy)hexane (I-5) | 2-Phenylbutyryl chloride, 2,5-Dimethyl-2,5-dihydroperoxyhexane | 87.2 | 37.1 | Solid (m.p., 55-63° C.) |
| 3-Hydroxy-1,1-dimethylbutyl Peroxy-2-phenylbutyrate (I-6) | 2-Phenylbutyryl chloride, 3-Hydroxy-1,1-dimethylbutyl hydroperoxide | 74.1 | 50.0 | Liquid |
| t-Butyl Peroxy-2-phenylpropionate (I-7) | 2-Phenylpropionyl chloride, t-Butyl hydroperoxide | 97.4 | 87.4 | Liquid |
| t-Amyl Peroxy-2-phenylpropionate (I-8) | 2-Phenylpropionyl chloride, | 97.9 | 78.8 | Liquid |

TABLE I-continued

| | t-Alkyl Peroxy-2-alkyl-2-arylacetates | | | |
|---|---|---|---|---|
| t-Alkyl Peroxy-2-alkyl-2-arylacetate | Reactants | Assay, % | Corr. Yield, % | Physical State |
| 1-(t-Butylperoxycarbonyl)-1-phenyl-cyclopentane (I-9) | t-Amyl hydroperoxide 1-Chlorocarbonyl-1-phenyl-cyclopentane, t-Butyl hydroperoxide | 83.6 | 54.1 | Solid (m.p., 48–50° C.) |
| t-Butyl Peroxy-2,2-diphenylacetate (C-1) | 2,2-Diphenylacetyl chloride, t-Butyl hydroperoxide | 94.5 | 73.7 | Solid |

EXAMPLE 3

Vinyl Chloride Suspension Polymerizations Employing the t-Alkyl Peroxy-2-alkyl-2-arylacetates as Free-Radical Initiators Several t-alkyl peroxy-2-alkyl-2-arylacetates of this invention were comparatively evaluated with several art peroxyesters at 55° C. in vinyl chloride suspension polymerizations. The vinyl chloride suspension polymerization procedure that was employed is described below:

Suspension Polymerizations

Polymerizations of vinyl chloride in suspension were carried out in a 1.5 liter reactor, which was designed and instrumented such that the polymerization could be monitored calorimetrically. The reactor was immersed in a water bath, maintained 0.5° C. above the desired reaction temperature, thus preventing any heat loss to the surroundings. The heat produced from the exothermic polymerization, plus the heat passed into the reactor from the water bath, was removed by the passage of cooling water through internal coils in the reactor. Thus, the temperature was kept constant. The flow rate of the cooling water and the temperature difference between entrance and exti streams were monitored; hence, a continuous recording of heat removed (cal. min$^{-1}$) was obtained.

The pressure in the reactor was also continuously monitored. At about 70% conversion of monomer to polymer, the monomer in the vapor phase became depleted and the pressure fell. Thus, from a knowledge of the point of 70% conversion and the heat of polymerization of vinyl chloride (23 kcal/mole), it was possible to calculate the "background count" in the calorimetric recording, this background being due to heat flow from the water bath to the reactor. By subtraction, the true rate of polymerization (cal. min$^{-1}$), as a function of time was obtained.

In the polymerizations the following sequence of operations was followed:

(1) The reactor was assembled and tested for leaks.

(2) The water bath around the reactor was heated to 0.5° C. above the desire reaction temperature.

(3) The cooling water bath was heated to 10° C. less than the reaction temperature.

(4) The aqueous phase plus suspending agents (described later) was heated to 10° C. above the desired reaction temperature, and charged into the reactor.

(5) The initiator compositions were added and the filling port sealed.

(6) The reactor was evacuated by the use of a water aspirator.

(7) The vinyl chloride (200 g) was added, by displacement with nitrogen, from a small cylinder; the reactor was pressurized with nitrogen to about 150 psi (guage). The addition of the cold vinyl chloride reduced the temperature of the aqueous phase to a point close to the desired reaction temperature.

(8) Stirring was commenced.

(9) The reactor controllers were switched on, beginning automatic control of the temperature, and continuous recording of heat output and pressure.

(10) After the pressure drop was observed, the pressure, temperature, and heat of polymerization were further monitored for another one to two hours. The reactor data after the pressure drop were then read to determine the rate of pressure drop, $\Delta P/\Delta t$. The $\Delta P/\Delta t$ was an important value, since it was a measure of the rate of polymerization after onset of the pressure drop. The larger the absolute value of $\Delta P/\Delta t$ the higher the rate of polymerization after the pressure drop and the higher the percent conversion of vinyl chloride monomer to polyvinyl chloride. After these data were obtained, the remaining vinyl chloride and nitrogen were vented and the reactor dismantled for cleaning.

| Suspension System Used (pH ~6.5) | |
|---|---|
| 1% Solution of Aerosol MA 80* | 42 ml |
| 1% Solution of Methocel F-50** | 168 ml |
| Triply distilled water | 469 ml |

*Sufactant made by American Cyanamid Co. (sodium dihexyl sulfosuccinate)
**Hydroxypropyl methylcellulose polymer made by Dow Chemical Co.
Note:
pH of the aqueous phase was measured at ambient temperatures, 22° C., using a standard pH meter.

TABLE II

Vinyl Chloride Suspension Polymerizations (55° C.) t-Alkyl Peroxy-2-alkyl-2-arylacetates

| Employed Peroxyester | Temp, °C. | pH | Peroxyester Concentration Grams per 100 g VCl* | Time to Pressure Drop, minutes | Rate of Pressure Drop, psi/hour |
|---|---|---|---|---|---|
| I-1 | 55 | ~6.5 | 0.121 | 255 | −37 |
| I-7 | 55 | ~6.5 | 0.113 | 230 | −22 |
| A-1 | 55 | ~6.5 | 0.125 | 280 | −20 |
| I-2 | 55 | ~6.5 | 0.128 | 230 | −40 |
| A-2 | 55 | ~6.5 | 0.133 | 240 | −17 |
| I-3 | 55 | ~6.5 | 0.149 | 200 | −37 |

TABLE II-continued

| | | Vinyl Chloride Suspension Polymerizations (55° C.) t-Alkyl Peroxy-2-alkyl-2-arylacetates | | | |
|---|---|---|---|---|---|
| Employed Peroxyester | Temp, °C. | pH | Peroxyester Concentration Grams per 100 g VCl* | Time to Pressure Drop, minutes | Rate of Pressure Drop, psi/hour |
| A-3 | 55 | ~6.5 | 0.153 | 240 | — |
| I-5 | 55 | ~6.5 | 0.120 | 260 | −15 |
| A-4 | 55 | ~6.5 | 0.124 | >300 | No pressure drop |
| C-1 | 55 | ~6.5 | 0.145 | >420 (53% conv) | No pressure drop |

*Equal to $5.1 \times 10^{-4}$ equivalents per 100 grams of vinyl chloride monomer.

Table II summarizes the times that were required for reaching the onset of the pressure drop [ca. 70% conversion of vinyl chloride monomer to polyvinyl chloride (PVC)] and the rate of pressure drop ($\Delta P/\Delta t$) after onset of the pressure drop when the t-alkyl peroxy-2-alkyl-2-arylacetates of this invention, i.e., t-butyl peroxy-2-phenylbutyrate (I-1), t-amyl peroxy-2-phenybutyrate (I-2), 1,1,3,3,-tetramethylbutyl peroxy-2-phenylbutyrate (I-3), 2,5-dimethyl-2,5-di-(2-phenylbutyrylperoxy)hexane (I-5) and t-butyl peroxy-2-phenylpropionate (I-7), were used for initiating suspension polymerizations of vinyl chloride monomer at 55° C. The pH of the suspension system was about 6.5 and $5.1 \times 10^{-4}$ equivalent of initiator per hundred grams of vinyl chloride monomer was employed in these polymerizations. Also included in Table II for comparison to I-1, I-2, I-3 and I-5, and I-7 are data for t-butyl peroxyneodecanoate (A-1) (a commercially available low temperature vinly chloride polymerization initiator), t-amyl peroxyneodecanoate (A-2) (also a commercially available low temperature vinyl chloride polymerization initiator), 1,1,3,3-tetramethylbutyl peroxyneodecanoate (A-3) and 2,5-dimethyl-2,5-di(-neodecanoylperoxy)-hexane (A-4), respectively. In addition, data for t-butyl peroxy-2,2-diphenylacetate (C-1) are included in Table II for comparison sake. C-1 which contains two aryl groups in the 2-position of the peroxyester rather than one aryl group and an alkyl group, is not covered by invention structure A. The data in Table II show that the initiators having structure A of this invention (e.g., I-1, I-2, I-3, I-5 and I-7) are significantly more efficient than are the corresponding art initiators (e.g., A-1, A-2, A-3 and A-4) or C-1. I-1 and I-7 are superior to A-1 with respect to lower time to pressure drop and/or more rapid rate of pressure drop. These data show that I-1 and I-7 would produce a significantly greater amount of polyvinyl chlorid (PVC) in a given amount of time at 55° C. than would A-1. The same would be true when comparing the rates of polymerization brought about by invention peroxyester I-2 with art peroxyester A-2, invention peroxyester I-3 with art peroxyester A-3 and invention peroxyester I-5 with art peroxyester A-4. In the case of C-1 (two aryl groups in the 2-positions of the peroxyester) no pressure drop was attained up to 420 minutes at 55° C. and only 53% conversion of vinyl chloride monomer to PVC was achieved. Hence, with respect to vinyl chloride polymerizations one aryl group in the 2-position of the peroxyester (such as invention peroxyesters I-1, I-2, I-3, I-5 and I-7) enhances the peroxyester initiating efficiency relative to when there are two aryl groups in the 2-position of the peroxyester (such as in comparison peroxyester C-1). This is surprising since one would expect that if one 2-aryl group in place of a 2-alkyl group in a peroxyester enhances the polymerization efficiency of a peroxyester, then two 2-aryl groups in place of two 2-alkyl groups in a peroxyester should enhance the efficiency of a peroxyester even more.

Based on the significantly better weight and equivalent efficiencies of the invention t-alkyl peroxy-2-alkyl-2-arylacetates when compared to prior art peroxyesters, PVC producers would prefer to use the invention t-alkyl peroxy-2-alkyl-2-arylacetates instead of the prior art peroxyesters for initiating polymerizations of vinyl chloride monomer since increased PVC production rates would result.

EXAMPLE 4

SPI Exotherms of the t-Alkyl Peroxy-2-alkyl-2-arylacetates of this invention

The unsaturated polyester resin in this example was a mixture of an unsaturated polyester and styrene monomer. The unsaturated polyester was an alkyd resin made by esterifying the following components:

| Component | Quantity |
|---|---|
| Maleic anhydride | 1.0 mole |
| Phthalic anhydride | 1.0 mole |
| Propylene glycol | 2.2 moles |

To the resulting resin was added 0.013% by weight of hydroquinone inhibitor. The alkyd resin had an Acid No. of 45–50. Seven (7) parts by weight of the above polyester (alkyd resin) was diluted with three (3) parts by weight of monomeric styrene. The resulting unsaturated polyester resin had the following properties:
 a. Viscosity (Brookfield No. 2 at 20 r.p.m.): 13.0 poise
 b. Specific gravity: 1.14

Curing Procedure

Gelation and cure characteristics of various initiators in the above unsaturated polyester resin were determined using the Standard SPI Exotherm Procedure ("SPI Procedure for Running Exotherm Curves-Polyester Resins", published in the Preprint of the 16th Annual Conference—Reinforced Plastics Division, Society of the Plastic Industry, Inc. February, 1961). Using the procedure at 80° C. (or 82° C.) the invention peroxyesters t-butyl peroxy-2-phenylbutyrate (I-1), t-amyl peroxy-2-phenylbutyrate-(I-2) and 1-(t-butyl-peroxycarbonyl)-1-phenylcyclopentane (I-9) and a commercially employed art peroxyester, t-butyl peroxypivalate (A-5), were evaluated. The results are summarized in Table III and show that I-1, I-2 and I-9 (curing agents of the instant invention) are significantly more active in curing of the unsaturated polyester resin than is peroxyester A-5 on both a weight basis and an equivalent basis.

TABLE III

| | | | SPI Exotherm Data | | | | |
|---|---|---|---|---|---|---|---|
| Curing Catalyst | Temp, °C. | % | Level EPHGR* | Gel, Mins | Cure, Mins | Pek Exotherm, °F. | Barcol Hardness |
| I-1 | 82 | 1.0 | $4.2 \times 10^{-3}$ | 0.15 | 1.2 | 338 | 45–50 |
| I-2 | 82 | 1.0 | $4.0 \times 10^{-3}$ | 0.15 | 1.2 | 341 | 45–50 |
| A-5 | 82 | 1.0 | $5.7 \times 10^{-3}$ | 1.05 | 2.2 | 347 | 45–50 |
| I-9 | 80 | 1.0 | $3.8 \times 10^{-3}$ | 0.2 | 1.4 | 339 | 30–40 |
| A-5 | 80 | 1.0 | $5.7 \times 10^{-3}$ | 1.0 | 1.8 | 410 | 40–50 |

*Equivalents per hundred grams of resin

What is claimed:

1. A process of polymerizing vinyl chloride monomer comprising adding to the reaction mass of said monomer an initiating amount of t-alkyl peroxy-2-alkyl-2-arylacetate of the structure:

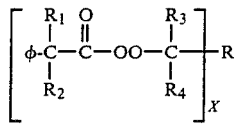

as the initiator and polymerizing said reaction mass until completion of the reaction wherein $R_1$ is hydrogen or an alkyl of 1 to 8 carbons, $R_2$ is an alkyl of 1 to 8 carbons, $R_1$ and $R_2$ can be joined together through an alkylene chain to form a cycloalkane ring containing 5 to 6 carbons, $\phi$ is an aryl of 6 to 10 carbons, $R_3$ and $R_4$ are lower alkyl of 1 to 4 carbons and can be joined together through an alkylene chain to form a cycloalkane ring containing 5 to 6 carbons, and X is an integer of 1–2, with the provisos that when X is 1, R is a substituted or unsubstituted alkyl of 1 to 9 carbons or an alkynyl of 2 carbons and when X is 2, R is an alkylene diradical of 2 to 4 carbons or an alkynylene diradical of 2 carbons, wherein the substitutents for R are selected from lower alkyl, hydroxy, or t-alkyl peroxy.

2. The process of claim 1 wherein the initiator is selected from the group consisting of t-butyl peroxy-2-phenylbutyrate, t-amyl peroxy-2-phenylbutyrate, 1,1,3,3-tetramethylbutyl peroxy-2-phenylbutyrate, t-butyl peroxy-2-phenylpropionate, and 2,5-dimethyl-2,5-di-(2-phenylbutyryl-peroxy)hexane.

* * * * *